(12) United States Patent
Crittenden (10) Patent No.: US 11,248,415 B1
(45) Date of Patent: Feb. 15, 2022

(54) ENERGY RECOVERY VENTILATOR DOOR

(71) Applicant: Jerry G. Crittenden, Phoenix, AZ (US)

(72) Inventor: Jerry G. Crittenden, Phoenix, AZ (US)

( * ) Notice: Subject to any disclaimer, the term of this patent is extended or adjusted under 35 U.S.C. 154(b) by 0 days.

(21) Appl. No.: 17/300,280

(22) Filed: May 10, 2021

Related U.S. Application Data

(63) Continuation-in-part of application No. 16/873,707, filed on Jun. 8, 2020, and a continuation-in-part of application No. 16/873,156, filed on Feb. 14, 2020.

(51) Int. Cl.
| | | |
|---|---|---|
| *E06B 7/04* | (2006.01) | |
| *F24F 7/007* | (2006.01) | |
| *F24F 12/00* | (2006.01) | |
| *F24F 13/18* | (2006.01) | |
| *F24F 13/28* | (2006.01) | |
| *F24F 13/14* | (2006.01) | |
| *E06B 7/10* | (2006.01) | |
| *E06B 7/02* | (2006.01) | |

(52) U.S. Cl.
CPC ............... *E06B 7/04* (2013.01); *E06B 7/10* (2013.01); *F24F 7/007* (2013.01); *F24F 12/006* (2013.01); *F24F 13/14* (2013.01); *F24F 13/18* (2013.01); *F24F 13/28* (2013.01); *E06B 2007/023* (2013.01)

(58) Field of Classification Search
CPC ........ E06B 7/02; E06B 7/10; E06B 2007/023; F24F 7/007; F24F 7/065; F24F 13/085; F24F 13/10; F24F 13/28; F24F 13/14; F24F 13/18; F24F 12/006
USPC .................. 454/195, 211, 265, 277
See application file for complete search history.

(56) References Cited

U.S. PATENT DOCUMENTS

| | | | | |
|---|---|---|---|---|
| 3,262,491 | A * | 7/1966 | Selhost | F24F 1/0328 165/48.1 |
| 9,109,389 | B1 * | 8/2015 | Crittenden | B29C 43/18 |
| 10,012,408 | B1 * | 7/2018 | Crittenden | E06B 7/28 |

* cited by examiner

*Primary Examiner* — Avinash A Savani
*Assistant Examiner* — Dana K Tighe
(74) *Attorney, Agent, or Firm* — H. Gordon Shields (57) ABSTRACT

An energy recovery ventilator door assembly includes an exterior door for a structure, the door including an inside fan and an outside fan for providing flows of air to a manifold. The manifold includes an inside manifold conduit for receiving stale inside air and an outside manifold conduit for receiving fresh outside air. A heat sink between the two conduits recovers heat energy from the warmer flow of air flowing in the conduits and transmits the recovered heat energy to the cooler of the flows of air in the conduits. A crossover element routs the inside conduit from the inside of the door to the outside of the door, and routs the outside conduit of the door to the inside of the door. Thus the air in the inside manifold conduit is vented to the outside of the structure through the door and the air in the outside manifold conduit is vented to the inside of the structure through the door.

20 Claims, 8 Drawing Sheets

ENERGY RECOVERY VENTILATOR DOOR

CROSS REFERENCE TO RELATED APPLICATIONS

This application is a continuation in part of application Ser. No. 16/873,707, filed Jun. 8, 2020, which is a continuation in part of application Ser. No. 16/873,156, filed Feb. 14, 2020.

STATEMENT REGARDING FEDERALLY SPONSORED RESEARCH OR DEVELOPMENT

NOT APPLICABLE

BACKGROUND OF THE INVENTION

Field of the Invention

This invention pertains to outside or exterior doors, and, more particularly, to an outside door having conduits of a heat transfer manifold. Stale interior air and fresh outside air flow through the conduits. A heat energy transfer element, or heat sink, in the manifold recovers heat energy from the air flowing in one the conduits of the manifold, and transfers the recovered heat energy to the other, the cooler, of the air flows in the other conduit.

Description of the Prior Art

U.S. Pat. No. 10,337,238 describes an outside or exterior ventilator door through which fresh outdoor air flows through a duct in the door. A heat sink in the duct transfers heat either from the outside fresh air to the inside of the structure to which the door is secured or from the inside of the structure to the outside fresh air flowing through the duct. Because there is only a one-way air flow, only a single fan or blower is needed.

SUMMARY

The present invention includes an outside door secured to a structure, and provides a two conduit manifold for two-way air flow. One flow is fresh outside air flowing into the structure, and the other flow is stale air from the interior of the structure flowing to the outside or exterior of the structure, or hallway for apartments.

Two fans or blowers are used to provide the two air flows. The manifold includes an inside portion and an outside portion in a side-by-side connection arrangement for maximum heat energy transfer from the air flows in the manifold. The recovered heat energy flows from the higher temperature air flow to the lower temperature air flow. The side-by-side disposition of the inside and outside manifold portions with a center wall heat sink comprise heat recovery and heat transfer elements.

Among the objects of the present invention are the following:

To provide a new and useful ventilator door;
To provide a new and useful outside door;
To provide a new and useful outside ventilator door which includes heat energy recovery elements;
To provide a new and useful exterior door having two-way air flows;
To provide a new and useful outside door including a manifold having an inside manifold conduit through which inside air flows and an outside manifold conduit through which outside air flows;
To provide a new and useful ventilator door having two air flows and a fan or blower for each air flow;
To provide a new and useful outside door having heat transfer elements for recovering heat energy and transferring the recovered heat energy from and between two air flows;
To provide a new and useful door having two air flows and elements for controlling the two air flows;
To provide a new and useful door having a manifold for providing an inside air flow and an outside air flow and a crossover section for directing the two flows of air to the inside and outside manifold conduits from outside and inside flows of air;
To provide a new and useful door having a frame including a top rail and a bottom rail;
To provide a new and useful door having elements located in top and bottom rails for controlling flows of air through the door;
To provide a new and useful exterior door assembly having a transom portion and a door below the transom portion and having air flow elements located in the transom area and having air flow elements located in the door below the transom portion;
To provide a new and useful exterior door assembly having a transom portion and a door below the transom portion with air flow elements located in the transom portion and in the door below the transom and having a seal between the transom portion and the door below the transom portion; and
To provide a new and useful exterior door assembly having a transom portion and a stile and rail door below the transom portion and having air flow elements located in the transom portion and in the door below the transom portion and in a bottom rail of the door.

DESCRIPTION OF THE PREFERRED EMBODIMENT

FIGS. 1-6 pertain to the parent applications of the present invention. All pertain to bringing fresh air into a structure through a door. The apparatus of FIGS. 1-4 also expels inside or interior air to the outside of the door. The following discussion is a brief explanation of the door structures shown in FIGS. 1-4.

Figure 1:
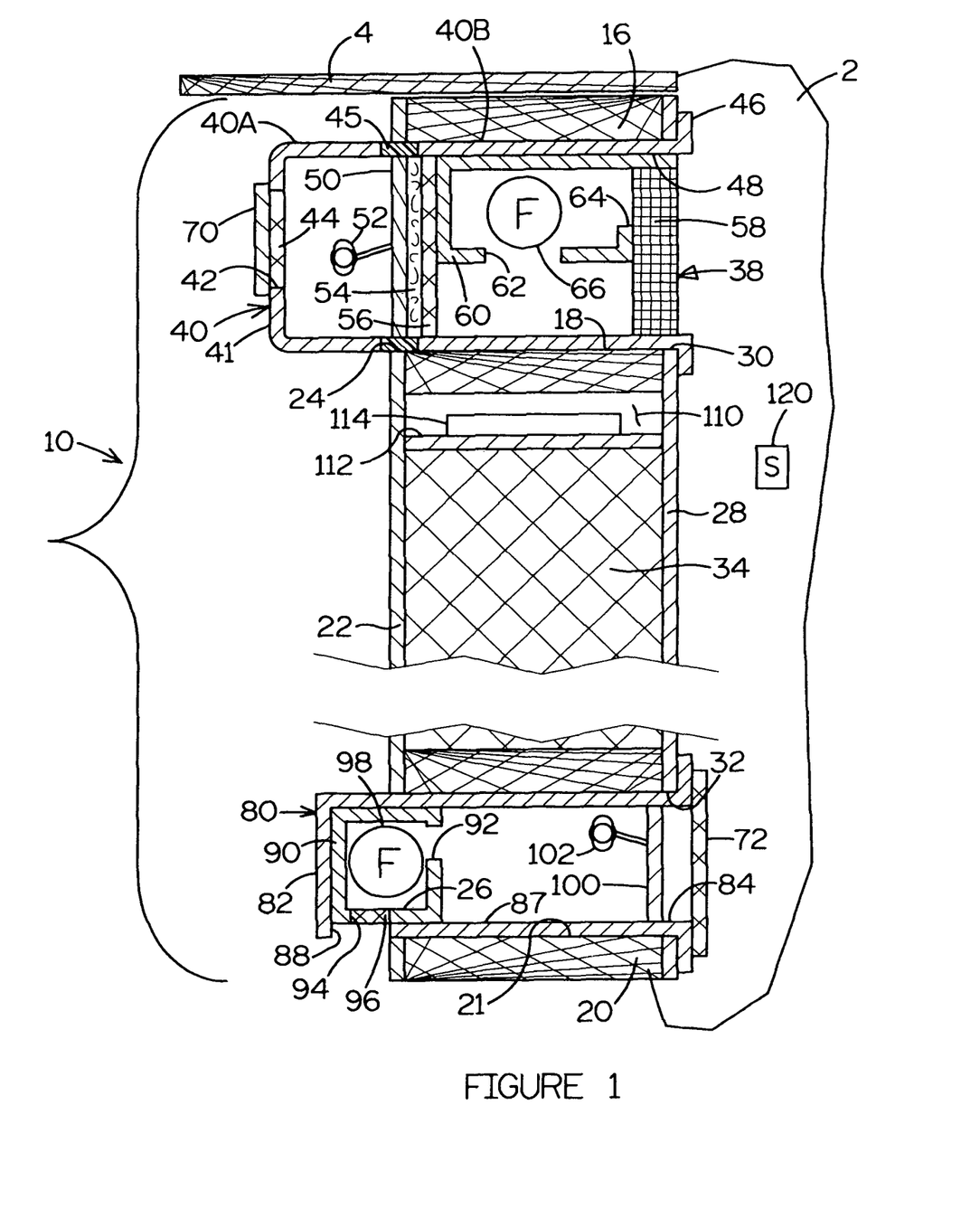
FIG. 1 is a view in partial section of an outside door 10 having two separate ventilator assemblies for respectively bringing fresh outside air into a structure through the door, and for exhausting stale inside air out through the door 10.
Figure 2:
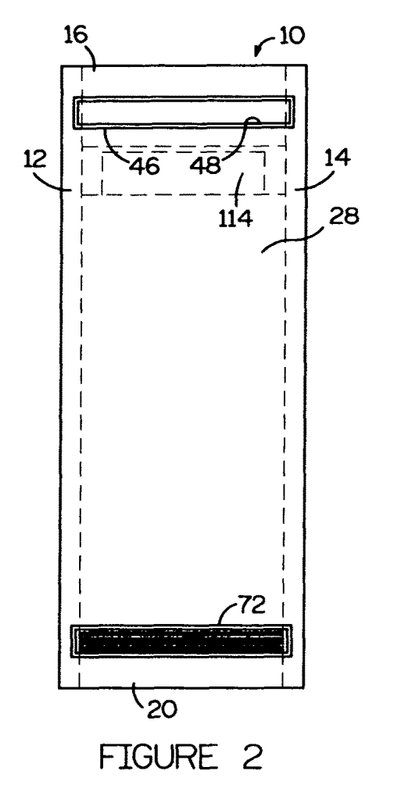
FIG. 2 is a front plan view of the door 10 of FIG. 1.

FIG. 1 is a schematic side view in partial section through an exterior or outside door 10. FIG. 2 is rear, or inside, view of the door of FIG. 1. For the following discussion reference may be made to both FIGS. 1 and 2.

The door 10 is situated in a structure 2. The structure 2 includes an overhang or jamb header 4 under which a portion of the door 10 is disposed.

The terms "outside" or "exterior" and "inside" pertain to the relationship of the door structure to which the door is secured. That is, the "outside" of the door 10 refers to the face of the door through which fresh outside air enters through the door. The "inside" of the door 10 refers to the face of the door from which the fresh outside air enters into the structure. 2. The term "ventilator" refers to the type of door through which fresh outside air passes or flows to provide fresh air to the inside of the structure. Thus, the door 10 is an exterior or outside "ventilator" door for both home and apartment structures. The terms herein defined also pertain to the other doors discussed herein.

The door 10 is schematically illustrated as a solid core door or conventional stile and rail frame construction. The scale has been exaggerated so as to clearly show the elements of the door structure. The door 10 as a frame including a pair of spaced apart stiles 12 ans 14 appropriately secured to an upper or top rail 16 and to a bottom or lower rail 20. See FIG. 2 in which the stiles are shown in dotted line. It is best shown in FIG. 2 that the top rail 16 extends vertically longer or taller than an "ordinary" door to accommodate the exterior air flow elements.

An outside skin 22 and an inside skin 28 are appropriately secured to the stile do rail frame.

The outside skin 22 includes an upper intake opening 24 and a lower exhaust or outflow opening 26. The inside skin 28 includes corresponding upper opening 30 an a lower vent of exhaust opening 32. The openings 26, 28, and 30, 32 are generally parallel to each other.

Within the door 10 is a solid core 34, preferably insulation. Secured to the door 10 and extending through an opening 18 in the top rail 16 is a ventilator assembly 38. The ventilator assembly 38 comprises a horizontally extending duct through which outside air is brought into the structure 2.

The ventilator assembly 38 includes an upper housing 40. The upper housing 40 includes an outside end wall 41 which extends outwardly from the planar portion of the door 10 as defined by the outer skin 22. There is a generally open end to the housing 40, remote, from the outside end wall 41 and generally parallel to the end wall 41, comprising an opening 48 and a vertically extending inside flange 46. The outside air flows into the structure 2 through the opening 48.

The upper housing 40 extends outwardly of the structure 2 and beneath the overhang or header 4. For apartment structures where the "outside" door opens into a corridor, there will be no overhang structure.

An opening 42 in the end wall 41 exterior or outer portion of the housing 40 is covered by a screen 44. At the opposite end of the housing 40, the flange 46 is disposed against the inside skin about the opening 30 in the skin 28. The housing 40 is secured to the door 10 through the flange 46 and through the skin 28 and into the top rail 16 by appropriate fasteners.

Fresh exterior or outside air flows into the housing 40 through the screen 44. The flow of outside air is controlled by a damper 50. The damper 50 is moved by an actuator 52. Air passes preferably through a pair of filters 54 and 56. The filter 54 is preferably a charcoal filter and the filter 56 is preferably a HEPA or a MERV filter.

Adjacent to a filter 56 is a fan housing 60. The fan housing 60 includes a lower opening 62 through which fresh outside filtered air flows into the fan housing 60 and to a fan 66. The flow of air produced by the fan 66 flows outwardly from the fan housing through an upper fan housing discharge opening 64.

Air flows through the filters 54 and 56 and through the opening 62 in response to the fan 66. From the fan housing 60 the air flows through the opening 64 and through a heat sink 58 and outwardly from the door 10 and into the structure 1 through the opening 48 in the upper housing 40.

The heat sink 58 is preferably an aluminum honeycomb heat sink. The heat sink 58 is in heat transfer contact with the housing 40 and with the fan housing 60, both of which are heat conductive.

At the lower portion of the door 10 are openings 26 and 32 in the skins 22 and 28, respectively. A lower housing 80 extends through the openings 26 and 32 and through an opening 21 in the lower or bottom rail 20. Air flow through the housing 80 is the opposite of the air flow through the housing 40. Inside stale air in the structure 2 flows outwardly from the structure 2 through the housing 80. Accordingly, the elements of the housing 90 are simpler than the elements associated with the upper housing 40.

The lower housing 80 includes an outer end wall 82 disposed outwardly from the inside skin 28. The opposite end of the housing 80, remote from the outer and wall 82, is an open end 84 through which the inside stale air flows into fan housing 90. The housing 80 includes a flange 86 disposed against the inside skin 28 and is appropriately secured thereto at the flange 86.

A damper 100 controls the flow of air through the open end 84. An actuator 102 moves the damper 100.

Air flowing into the housing 80 through the opening 84 into a fan housing 90 by a fan 98. The air flows through an opening 92 in the fan housing 90, and flows outwardly from the fan housing through an opening 94 at an opening 88 in the housing 80.

A grill 72 covers the opening 84, and a screen 96 covers the opening 94.

The lower fan housing 90 is disposed against the end wall 82 of the lower housing 80.

The actuators 52 and 102 are controlled by electronic elements located in a chamber or compartment 110. The compartment 110 is disposed between the bottom of the top rail 16 and a plate 112. Appropriate electronic elements or components, including electrical power elements, are disposed in a housing 114 in the compartment 110.

Sensors 120 are schematically illustrated. The use of microprocessors and sensors is well known and understood in contemporary usage for controlling actuators. Also well known are elements for bringing electrical power into doors and accordingly not shown.

As may be understood from FIG. 2, the upper housing 40 and the fan 66 and the opening 48 with the flange 46 extend substantially the entire width of the door 10 between the stiles 12 and 14 od the door frame for maximum air flow.

Similarly, the lower housing 80 and its fan 98 in the fan housing 90 and the grill 72 also extend substantially the full width of the door 10 between the stiles of the door frame.

Note that the wiring for the fans and damper actuators is not shown for purposes of clarity. Also, the hardware for the door 10 is not shown.

Figure 3:
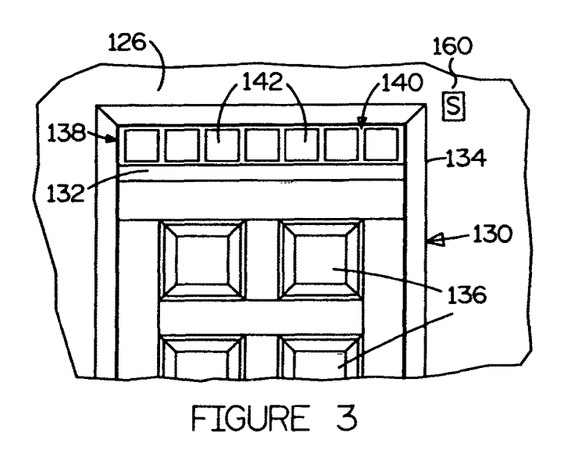
FIG. 3 is a front, outside partial view of the top portion of an alternate embodiment of the door 10.
Figure 4:
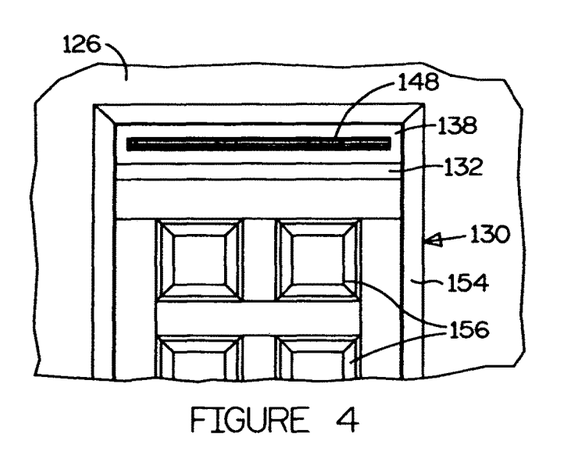
FIG. 4 is a rear inside partial view of the door of FIG. 3.

FIG. 3 is a fragmentary view of the upper portion of a ventilator assembly 138 disposed in a structure 126. FIG. 3 shows an outside or exterior view of the ventilator assembly 138. FIG. 4 is a similar fragmentary view of the ventilator assembly 138 providing an inside view of the ventilator assembly 138. The ventilator assembly 138 is an alternate embodiment of the ventilator assembly of the door 10, and includes a door 130 and a transom area 132 above the door 130.

The ventilator assembly 138 of FIG. 3 includes a ventilator housing 140, with a plurality of grills or screens 142 secured to the housing 140. Fresh air flows through the grills or screens 142 into the ventilator housing 140. Within the housing 140 are the corresponding elements for the ventilator assembly 38 of FIG. 1, including a damper and a damper actuator, at least a single filter, a fan housing and a fan within the fan housing, an opening through which air flows into the fan housing, and a discharge opening through which air flows from the fan housing and into the structure 126.

The air flowing out of the fan housing flows through a heat sink 148, shown in FIG. 4, at the discharge opening of the fan housing and into the structure 126.

Sensor 160 is schematically shown in FIG. 3. Sensor 160 corresponds to the sensor 120 of FIG. 1.

Decorative panels or elements 136 are shown on the door 130. Decorative panels 156 are shown in FIG. 4 on the inside of the door 130. The extent of the decorative elements is, of course, a matter of choice.

Figure 5:
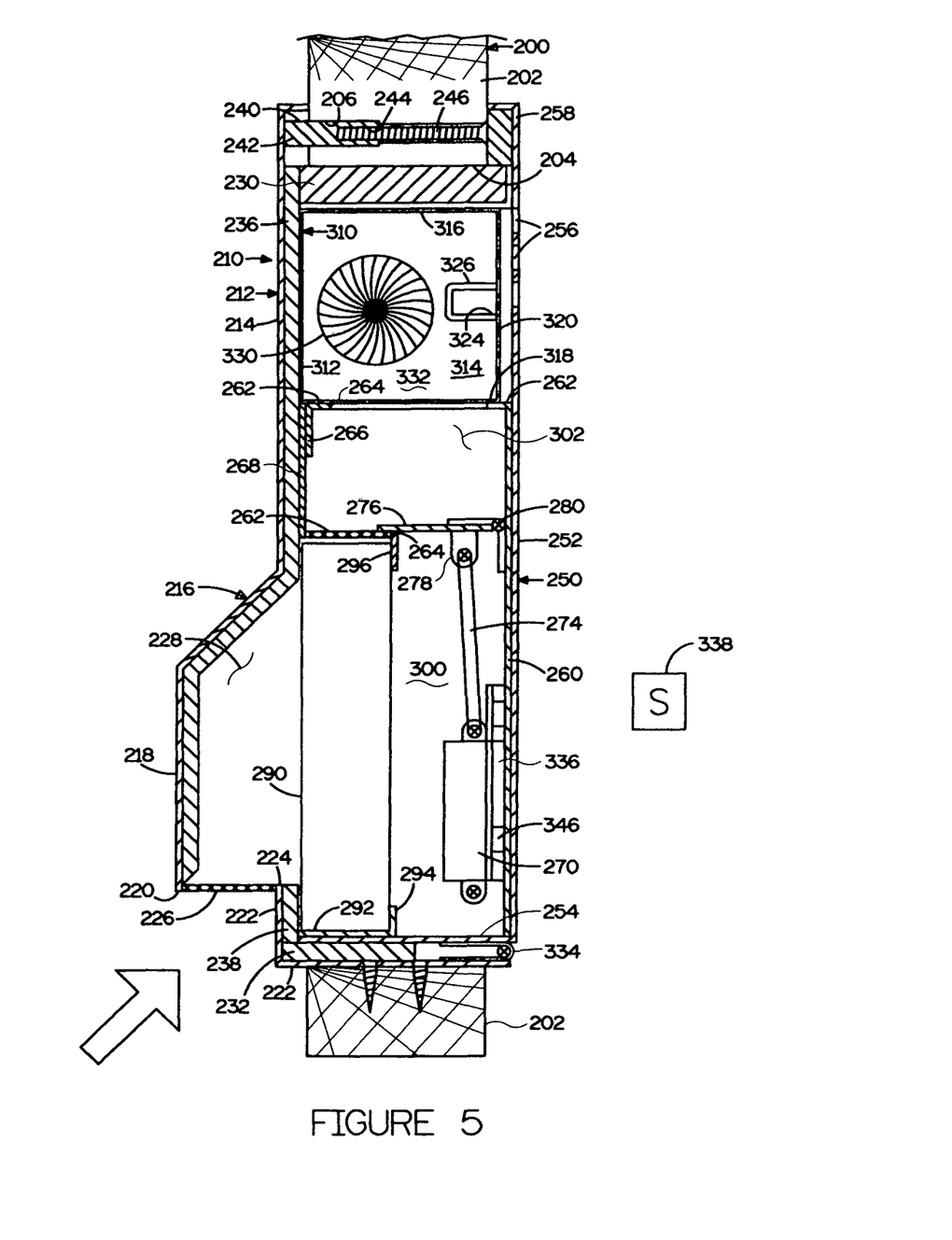
FIG. 5 is a view in partial section of a ventilator assembly for an outside door for bringing fresh outside air into a structure and the ventilator assembly has a pivoting section for ease of changing a filter.

Molding 134 is shown about the exterior or outside of ventilator assembly 138 in FIG. 3. Molding 154 is shown in FIG. 5 on the inside of the ventilator assembly 138. Again, the extent of decorative elements is a matter of choice.

The heat sinks 58 and 148 provide for the conditioning of air by transferring heat from the higher temperature air to the lower temperature air. Thus, in the summer, the warmer fresh outside air may be cooled somewhat by air flowing through the heat sink from the cooler inside air. The opposite may occur in the winter, by the cooler fresh outside air being warmed by the warmer inside air.

A lower ventilator assembly corresponding to the housing 80 of FIG. 1, with its associated elements, may be included with the door 130.

A transom area in a door assembly has the advantage of pre-wiring the system and may provide a larger space or area for larger elements, including a larger fan and simpler electronic and electric wiring systems.

FIG. 5 is a view in partial section through the lower portion of an exterior ventilator door 200, and specifically through a bottom rail 202 of the door 200. The bottom rail 202 includes an opening 204. A ventilator assembly is disposed in the opening 204.

Figure 6:
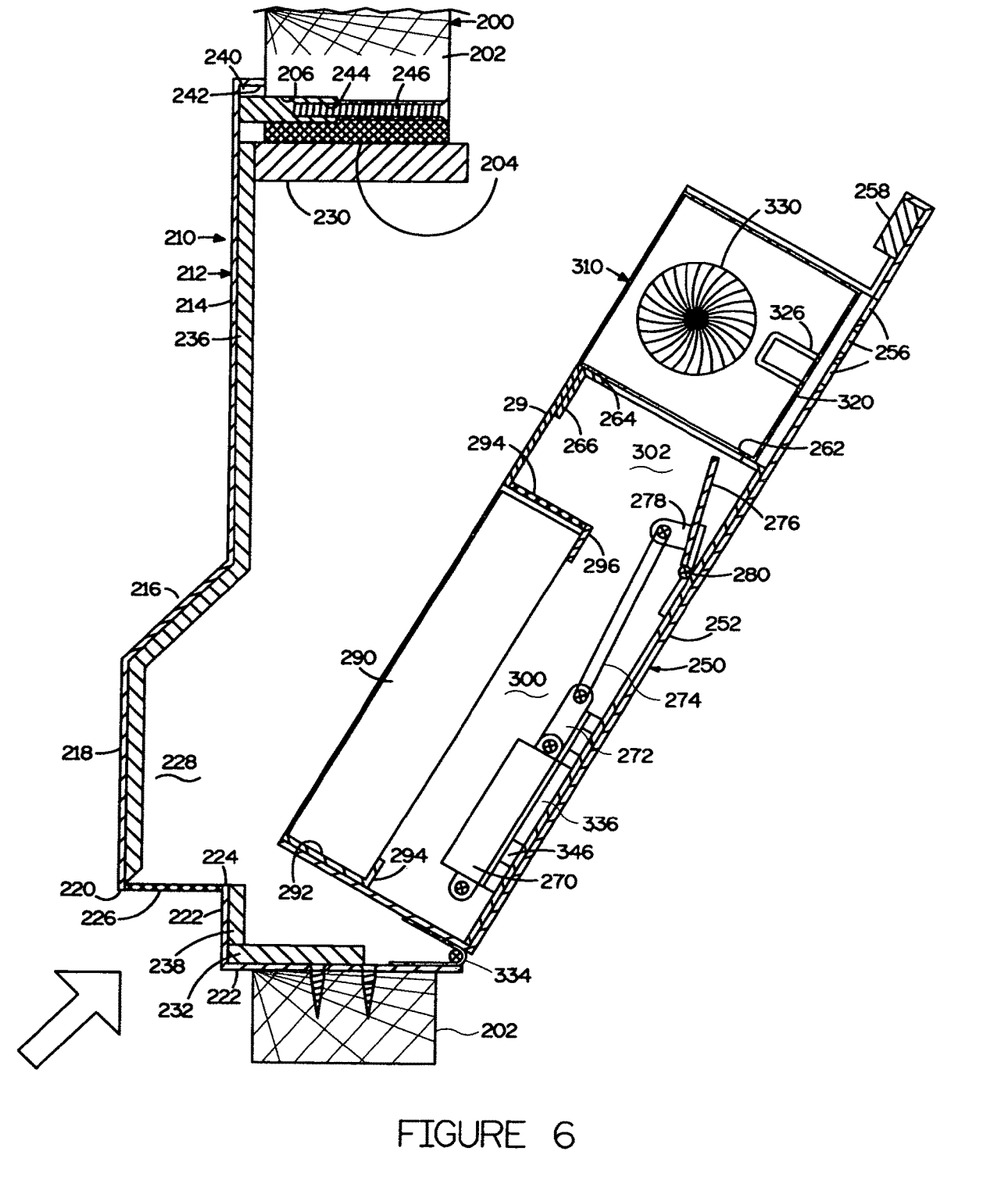
FIG. 6 is a view in partial section of the ventilator assembly of FIG. 5 with a pivoting section in the open position.

The ventilator door 200 includes a pivoting filter assembly shown in the closed position in FIG. 5 and in the open position in FIG. 6

The ventilator assembly 210 includes a housing 212. The outside portion of the housing 212 includes an upper housing portion 214 and a lower outwardly and downwardly or bump out portion 216, and a lower vertical portion 218. The lower vertical portion terminates at a bottom rim 220. Spaced apart from the lower vertical portion 218 is a bottom vertical portion 222. The bottom vertical portion 222 has a top rim 224. A screen 226 extends between the rims 220 and 224. An air intake chamber 228 is defined within the housing portions 216, 218, and 222. The screen closes the bottom of the chamber 228.

The ventilator assembly 210 includes an upper block 230 and a lower block 232. The blocks 230 and 232 are appropriately secured to the bottom rail 202 in the opening 204.

Insulation 236 is shown disposed between the ventilator housing 212 and the blocks 230 and 232.

The upper assembly housing portion 214 is secured to the bottom rail 202. A plurality of stepped bores 206 extend through the bottom rail 202 above the block 230. The ventilator assembly 210 is secured to the door 200 at the bottom rail 202 by a lock assembly 240. The lock assembly includes a block 242, which extends substantially between the stiles (not shown) of the door 200. The block 242 is secured to the upper housing portion 214.

It will be understood that the ventilator assembly 210 extends between the vertical stiles of the door 200, as with the doors 10 and 130 of FIGS. 1-4, and as best illustrated in FIG. 2. Accordingly, the housing 212 will be secured along the width of the door 200 by the lock assembly 240. A plurality of screws 246 extend into a plurality of internally tapped bores 244 to secure the ventilator housing 212 to the ventilator door 200 at the bottom rail 202.

A pivoting assembly 250 includes an inside skin 252. The inside skin 252 includes a bottom portion 254. At the upper portion of the skin 252 are openings 256 through which air flows outwardly from the ventilator assembly 210 and thus from the ventilator door 200.

A block 258 is secured to the inside skin 252 and is disposed against the lower rail 202 and covers the head of the screw 246 when the pivoting assembly 250 is in its closed position.

An inside vertical panel 260 is disposed against the skin 252. The panel 260 includes a horizontal portion 262 and a downwardly extending flange 266. An opening 264 extends through the horizontal portion 262.

Secured to the panel 260 is an actuator 270. The actuator 270 includes a piston rod 272 and a pivoting actuator rod 274 is connected to the piston rod 272. The pivoting actuator rod 274 is in turn connected to a damper 276 through a damper lug 278. The actuator rod 274 pivots on the piston rod 272 and the damper lug 278 as it moves the damper 276 between the closed position covering the opening 264 as shown in FIG. 5 and an open position as shown in FIG. 6.

The damper 276 controls the flow of air through the opening 264 as the damper 276 is moved by the actuator 270. The damper 276 pivots on a damper hinge 280.

A filter 290 is secured to the ventilator assembly 210 by a bottom frame element 292 and a top frame element 296. The bottom frame element 292 is secured to the bottom portion 254 of the inside skin 252. The top frame element 296 is secured to the horizontal portion 262. The filter 290 may be a HEPA or a MERV filter, or other, as desired.

As the pivoting assembly 250 pivots outwardly, the filter 290 is accessible for removal and reinserting. This is clearly shown in FIG. 6.

A fan housing 310 is disposed in the upper portion of the pivoting assembly 250. The fab housing 310 is generally rectangular and includes a back wall 312, a pair of side walls 314, only one of which is shown, a top wall 316, a bottom wall 314, which bottom wall includes an opening 320, and a front wall 322. There is an opening 324 in the front wall 322 through which air flows out of the fan housing 310 through the openings 256 in the inside skin 252.

A restrictor element 326 is secured to the front wall 310 to control the flow of air from the fan housing 310 to insure that the flow of air flows outwardly f rom the door 200 through the opening 324.

Air flow is produced by a fan or blower 330. The fan 330 may be a variable speed fan or a constant speed fan, or a multiple speed fan, as desired.

The flow of air through the pivoting assembly 250 is inwardly through the screen 226 into the intake chamber 228. From the chamber 228 the air flows through the filter 290 into a lower chamber 300, through the opening 264 into a fan chamber 302, and then outwardly through the opening 264, The opening 264 is controlled by the damper 276.

A middle chamber 302 receives the air flow from the lower chamber 300. From the middle chamber 302 the air flows through the opening 264 into a fan chamber 332. The air flow then flows outwardly through the opening 324 and the openings 256. The air flow thus flows out of the ventilator assembly 210 and outwardly from the ventilator door 200 and into a structure to which the door 200 is secured.

The fan 330 produces the air flow into, through, and outwardly under appropriate computer control, well known and understood. A housing 346 containing the appropriate and necessary associated electronic control elements is schematically shown secured to the inside plate 260 and to the actuator 270. Appropriate control signals from the electronic elements in the housing 346 are transmitted to the actuator 270 for controlling the damper position and for controlling the fan 330.

A sensor 338 senses desired information and transmits the information to the circuitry in the housing 346 for controlling the damper 276 and the fan 330.

The pivoting assembly 250 pivots of a hinge 334 appropriately secured to the bottom rail 202 and the bottom portion of the inside skin 252. The pivoting may be manual or by means of a motor, not shown, but well known and understood. The pivoting is in response to the need to replace or clean the filter 290.

Figure 7:
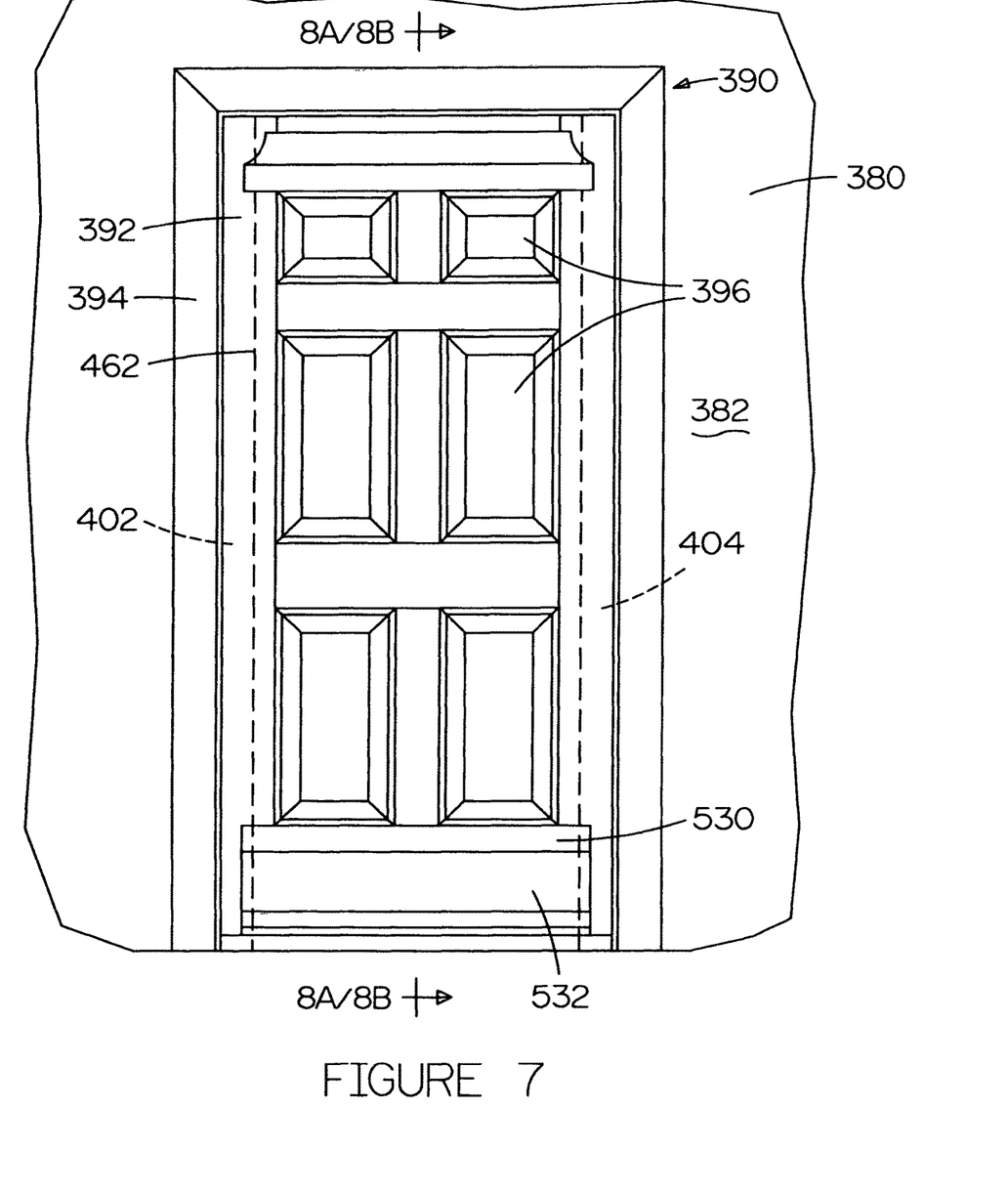
FIG. 7 is an outside plan view of an energy recovery ventilator door assembly 390 of the present invention secured to a structure 380.

FIG. 7 is a schematic front (outside) view of an energy recovery ventilator door assembly 390 of the present invention secured to a structure 380. The structure 380 schematically represents the use environment of the door assembly 390. The door assembly 390 includes a door 392 secured to the structure 380, and decorative block elements 396 are shown secured to the door 392. Secured to the structure 380 about the door 392 is exterior molding 394. The molding 394 is secured to a door jamb, of which a portion 398 of the door jamb is shown in FIG. 8A.

The term "ventilator" has been defined above, pertaining to the door 10 and the door 392. The term as applied to the embodiments of FIGS. 7, 8A, 8B, and 9, also includes not only bringing fresh outside air into a structure, but also the discharge of stale inside air out of the structures.

Figure 8A:
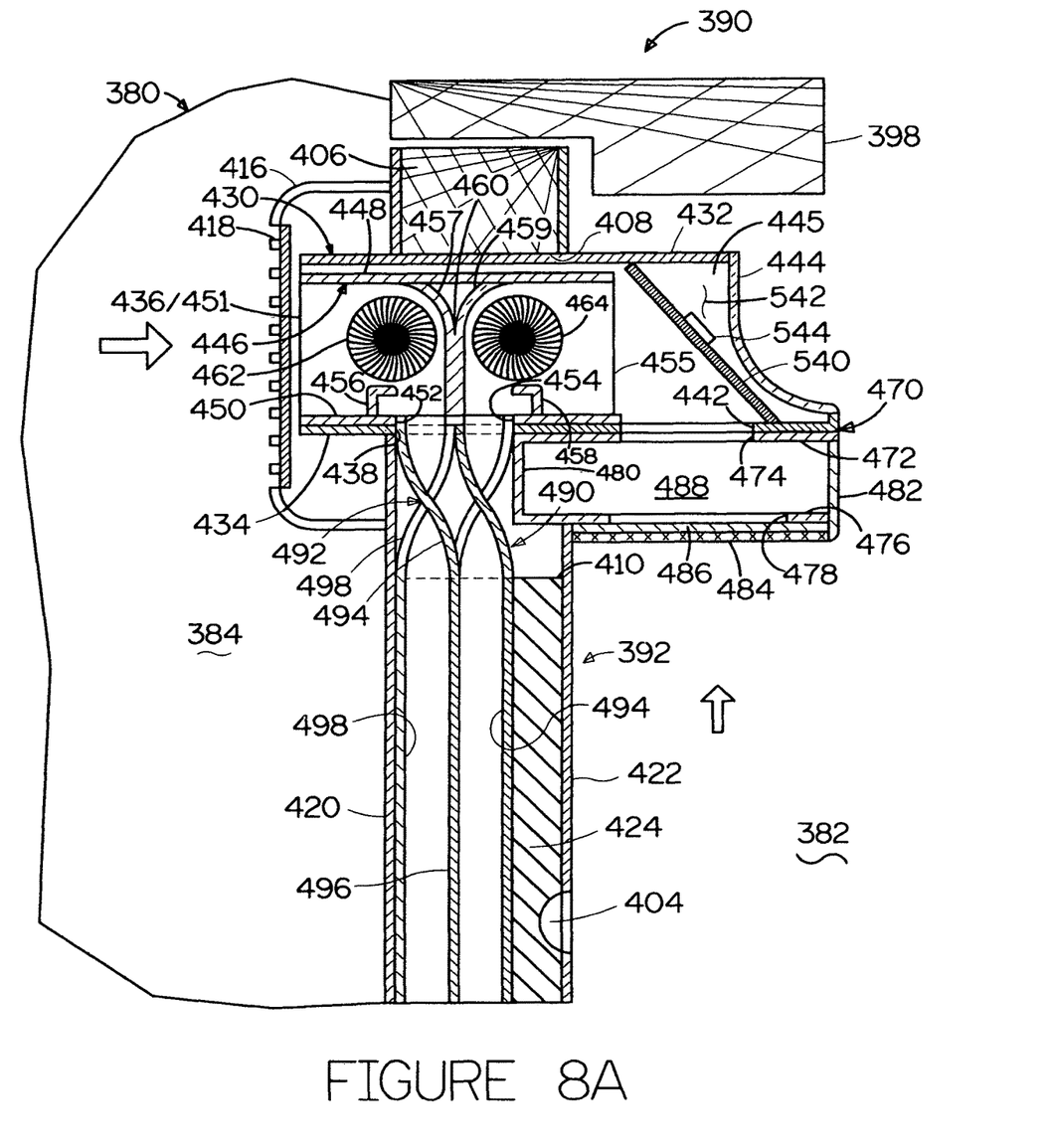
FIG. 8A is a view of the top portion of door assembly 390 of FIG. 7 taken along line 8A—8A of FIG. 7 shown in partial section.
Figure 8B:
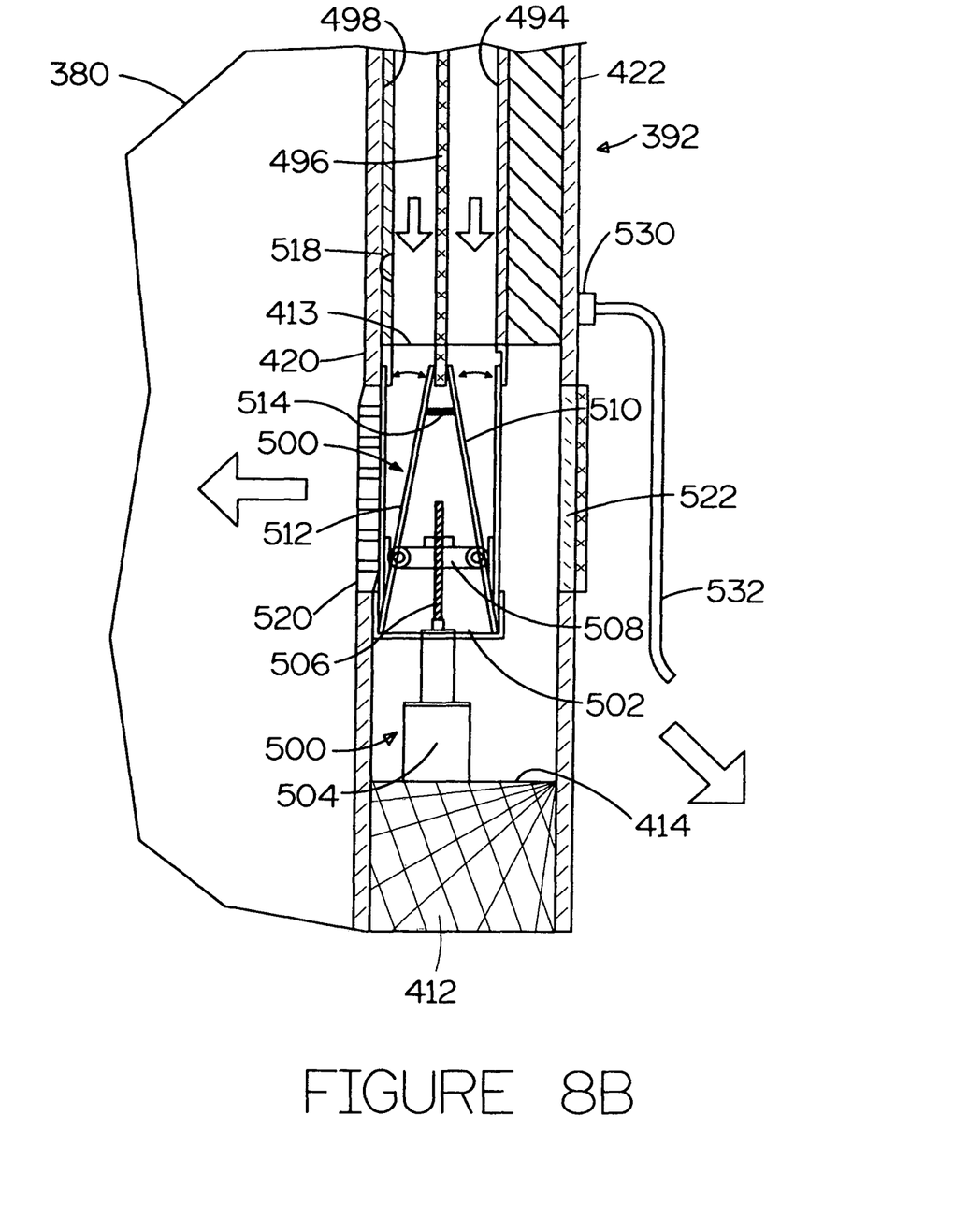
FIG. 8B is a continuation of FIG. 8A in partial section.

FIGS. 8A and 8B are views in partial section taken generally along line 8A/8B—8A/8B of FIG. 7. FIG. 8A shows the upper portion of the door 392 of FIG. 7, and FIG. 8B shows the lower portion of the door 392, and is a continuation of FIG. 8A. FIGS. 8A and 8B schematically show outside air mass 382 and inside air mas 384. For the following discussion reference may be made to FIGS. 7 and 8A and 8B.

The door 392 may be a typical stile and rail door having a frame comprising a pair of spaced apart stiles 402 and 404, shown in dotted line in FIG. 7, and a portion of the stile 404 is shown in FIG. 8A. The door 392 also includes an upper or top rail 406 and a bottom or lower rail 412. The stiles and rails are appropriately secured together to comprise a frame for the door 392. The rails are taller than a "normal" stile and rail door to accommodate air flow elements as shown in the drawing figures and as discussed below.

The top rail 406 has an opening 408, into which is inserted control elements and air flow elements. The bottom rail 412 has an opening 414 into which damper control air flow elements 500 are inserted.

An inside panel 420 is secured to the stile and rail frame, and an outside panel 422 is also secured to the stile and rail frame. Insulation 424 is disposed against the outside panel 422.

The panels 420 and 422 include openings aligned with the openings in the rails to accommodate the various air flow elements.

The terms "inside" and "outside" used herein refer to the assembly 380 and to the door 392. Inside air mass 384 is on the "inside: of the structure 380. The panel 420 is also on the "inside" of the door 392.

The air mass 382 and the panel 422 are on the "outside" of the structure 380 and on the "outside" of door 392.

FIG. 8A schematically shows part of a door frame member 398 of the structure 380. The door 392 is secured to the structure 380 through a door frame, as is well known and understood.

The door 392 includes an inside grill housing 416 secured to the structure 380 at the upper rail 406. An inside screen 418 is secured to the grill housing 416.

A fan housing 430 is disposed partially within the opening 408 in the upper or top rail 406. The fan housing 430 includes a top wall 432, an inside bottom wall 434 through which extends an inside opening 438. The fan housing 430 includes an open inside end 436. Inside air flows into the fan housing 430 through the grill assembly and screen 418 and through the open end 436.

The an opening 442 also extends through the bottom wall 434.

A pair of side walls, of which a side wall 445 is shown in FIG. 8A. A decorative concavely curved end wall 444 completes the fan housing 430.

While a single fan may be used to provide two flows of air, two fans are preferred. An inside fan 462 and an outside fan 464 are disposed in a removable housing 446. The movable housing 446 is disposed within the fan housing 430 and on the bottom wall 434. The removable housing includes a top wall 448 and a bottom wall 450. The removable housing 446 includes an inside open end 451 which is aligned with the open end 436 of the fan housing 430. Two openings 452 and 454 extend through the bottom wall 450. The opening 452 is an inside opening and the opening 454 is an outside opening. The purpose of the removable housing 446 is to allow for the maintenance and replacement of the fans 462 and 464

The movable housing 446 has an open outside end 455. An inside air flow restrictor 456 is secured to the bottom wall 450 adjacent to the inside opening 452 and a air flow restrictor 458 is disposed adjacent to the outside opening 454.

A curved air flow director 457 extends from the top wall 448 to a dividing wall 460 to direct air flow from the inside fan 462 downwardly through the inside opening 452. A curved air flow director 459 extends from the top wall 448 to the dividing wall 460 to direct air flow from the outside fan 464 downwardly through the opening 454.

It will be noted that the movable housing 446 also has side walls which are appropriately secured to the identified top and bottom walls. The side walls have been omitted for purposes of clarity.

A filter housing 470 is disposed beneath the outside bottom wall portion 440 and the opening 442 and is appropriately secured to the concave end wall 444 and the bottom wall 434 of the fan housing 430.

The filter housing 470 includes a top wall 472. An opening 474 extends through the top wall 472 and is aligned with the opening 442 in the bottom wall 434 of the fan housing 430.

The filter housing 470 also includes a bottom wall 476 and an end wall 480. An opening 478 extends through the bottom wall 476. A pair of side walls, not shown, is also included in the filter housing 470.

A pivoting outside end wall 482 closes the outside end of the filter housing 470. The end wall 482 pivots to provide access to a pre-filter 584 and a primary filter 488. The pre-filter 484 is preferably an activated carbon (charcoal) filter and the primary filter 488 is preferably a HEPA or a MERV filter. Obviously, any appropriate filter may be employed.

A screen 484 is disposed beneath the pre-filter and os appropriately secured to the filter housing 470.

Air flow through the screen 484, the pre-filter 486, the primary filter 488 and the aligned openings 474 and 442 and through the open end 455 into the movable housing 462 is provided by the outside fan 464.

A manifold assembly 490 is secured in the door 392, with a crossover portion 492 is disposed in the top or upper rail 406, and a conduit portion is disposed between the upper and lower rails.

The manifold assembly 490 extends substantially the width of the door 393 between the stiles 402 and 404 with the conduit portion disposed between the rails. See FIG. 7.

The conduit portion of the manifold assembly includes an outside manifold conduit 494 and an inside manifold conduit 498. A common center wall 496 connects the outside and the inside manifold conduits 494 and 498, respectively. The common center wall 496 comprises a heat transfer element or heat sink portion of the ventilator door assembly 390. The manifold conduits are obviously heat conductive.

The manifold assembly 490 includes the crossover portion 492 disposed at the lower part of the top rail 406, above the conduit portion. As shown in FIG. 8B, the inside and outside manifold conduits and the center wall heat sink portion extend slightly into the opening 414 of the bottom rail 412. This will be discussed below.

The center wall 496 is a heat sink, recovering heat from the flow of air in the manifold conduits 494 and 498 and transferring the recovered heat from one manifold conduit to the other manifold conduit, and accordingly from one air flow to the other air flow, in accordance with heat transfer principles discussed below.

The purpose of the crossover 492 is to route the inside air to the outer portion of the door 392, and to route the outside air to the inner portion of the door 392 by crossing over the inside conduit 494 from the inside or inner portion the door to the outer portion of the door, and vice versa. This is clearly shown in FIG. 8A. Air flow from the inside fan 462 is routed by the crossover 492 by routing the inside conduit 494 to the outer portion of the door adjacent to the insulation 424. The air flow from the outside fan 464 is routed to the inner portion of the door 392 adjacent to the inside panel 420, by routing the outside conduit 498 to the inside of the door 392 adjacent to the inside panel 420.

Since heat always flow from a warmer source to a cooler source, the warmer air source will be considered the first air flow herein, and the cooler air source will be considered the second air flow herein. The source of both air flows will be the manifold conduits. That is, the air flows produced by the inside and outside fans 462 and 264, respectively, as described above.

The heat recovery process will modify the air flowing in both manifold conduits. The first flow of air will lose heat energy and the second flow of air will gain heat energy. The manifold conduits themselves may be in heat transfer contact to transfer heat as well as the center wall heat sink to aid in the process of heat recovery and transfer.

In the summer, generally the outside air is warmer than the inside air, and therefor heat energy will be transferred to the common center wall heat sink 496 from the outside conduit 498, and from the common wall heat sink 496 to the inside conduit 494. Accordingly, the stale inside air flowing through the inside conduit 494 will absorb heat energy and will transfer that heat energy to the outside of the structure 380. The result from the heat energy recovery and heat energy transfer is to cool the fresh air flowing into the structure 380.

The heat transfer depends on the heat differential between the outside air mass 382 and the inside air mass 384, or the temperature difference between the air masses. The air masses 382 and 384, shown schematically in FIG. 8A.

In the winter, the opposite heat energy transfer takes place. The stale warmer inside air transfers heat energy to the cooler outside air flowing into the structure. The stale inside air is vented outside the structure 380, and the fresh outside air is brought inside the structure 380.

The door 392 is thus always a ventilator door, bringing fresh air into the structure 380 and venting stale inside air out of the structure. The recovered heat energy is always transferred from the warmer air to the cooler air, or from the first air flow to the second air flow, by the manifold assembly 490, thereby increasing the efficiency of the heating and cooling of the structure 380.

Air flow through the door is controlled by a damper assembly 500, shown in FIG. 8B. The damper assembly 500 is disposed at the bottom of the door 392 in the opening 414 of the bottom rail 412. The damper assembly 500 includes a motor 504 and a rotating screw 506. A follower or nut 508 moves vertically on the screw 506 between a pair of damper plates 510 and 512 as the screw 506 is rotated by the motor 504.

The motor 504 is disposed on the opening 414 and the rotating screw 506 and the follower or nut 508 are secured in a U-shaped base element 502. The base element 502 is secured to the motor 504.

The damper plates include the inside damper plate 510 and the outside damper plate 512, The damper plates 510 and 512 are pivotly secured to the base element 502. The damper plates 510 and 512 pivot to open or close the air flows at the bottom of the manifold conduits 494 and 498, respectively. The inside damper plate 510 controls air flow in the inside manifold conduit 494, and the outside damper plate 512 controls the air flow in the outside manifold conduit 498.

The damper plates 510 and 512 are spring biased to the open position as shown in FIG. 2B by a tension spring 514. As the motor 504 rotates the screw 506 in one direction, the follower or nut 506 moves vertically upwardly and pushes the damper plates 510 and 512 apart to restrict the air flowing downwardly in the manifold conduits 494 and 498. Rotation of the screw 506 in the opposite direction causes the follower or nut 508 to move downwardly, and the tension spring 514 biases the damper plates to their open position to allow more air to flow. Curved double ended arrows illustrate the pivoting of the damper plates 510 and 512.

For maximum air flow, the damper plates 510 and 512 are disposed against the lower or bottom portion of the center common wall heat sink 496, as shown in FIG. 8B. The center common wall 496 extends slightly below the inside and outside manifold conduits 494 and 498, respectively, Movement of the damper plates 510 and 512 accordingly controls the air flowing into and out of the door 392. Note that the damper plates 510 and 512 are shown in FIG. 8B in both the full open and full closed positions, as indicated by the double ended curved arrows.

Reference numeral 413 indicates the top of the bottom rail 412. It will be noted that the bottoms of the conduits 494 and 498 and the center wall 496 extend slightly into the opening 414 of the rail 412.

Fresh outside air flows from the conduit 498 into the structure 380 through a register or grill 520. Stale inside air flows from the inside conduit 494 and outside the structure 380 from the ventilator assembly 392 through an outside grill 522. The open arrows in FIGS. 8A and 8 B illustrate the air flow into and out of the door 392.

An outside decorative plate 532 deflects the air flow from the grill 522 and protects the grill 522 from the elements. The plate 532 is secured to the door 392 by a plate 530. See also FIG. 7

Returning to the fan housing 430 in FIG. 8A, a downwardly and outwardly slanted wall 540 extends from the top wall 432 to the bottom wall 434 outwardly from the aligned openings 442 and 474. The slanted wall 540 creates an electronics chamber 542 with the top wall 432 and the concave panel 444. Secured to the slanted wall 540 is a circuit board 544.

The circuit board 544 schematically represents control elements for controlling the fans 462 and 464 and the damper actuator motor 504. Such control elements are well known and understood. Accordingly such details have been omitted for purposes of clarity. Likewise, structure for providing electrical current for the elements in a door is also well known and understood and has also been omitted.

It will be noted that the slanted wall 540 also directs the outside air flowing upwardly through the filters 486 and 488 and through the openings 474 and 442 into the outside fan 464. Thus the slanted wall 540 serves a dual purpose.

Figure 9:
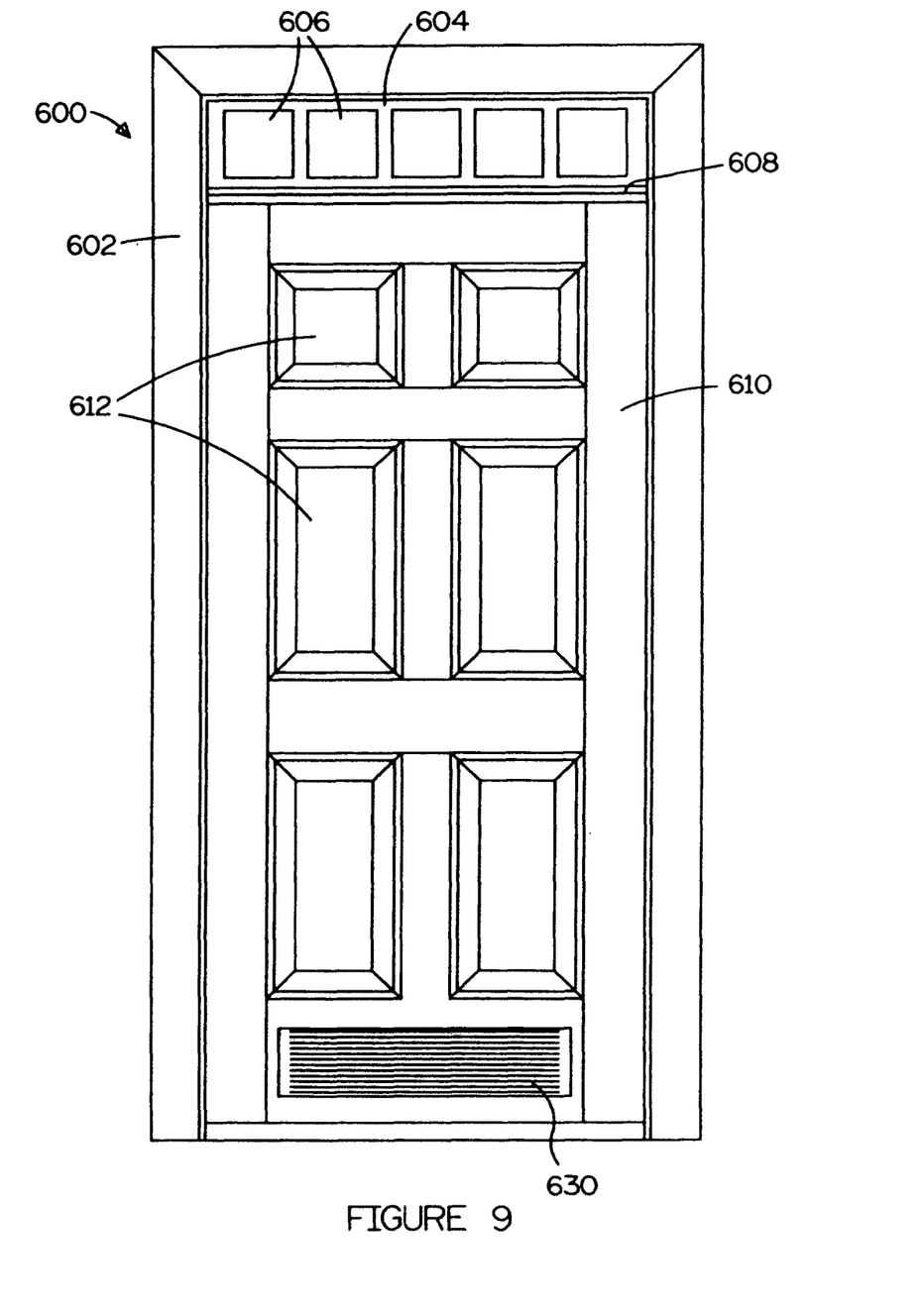
FIG. 9 is a front, inside view of an alternate door assembly embodiment 600 of the door assembly 390 of FIGS. 7, 8A and 8B.

FIG. 9 is a schematic front or inside view of an energy recovery ventilator door assembly 600, designed primarily for apartments, condominiums, and the like. The energy recovery ventilator door assembly 600 includes a common door frame comprising stiles and rails appropriately secured together, such as the door assembly 390 discussed above. The door assembly energy recovery ventilator door assembly 600 is an alternate embodiment of the door assembly 390 of FIGS. 7, 8A and 8B.

The energy recovery ventilator door assembly 600 includes a door 610 and a fixed transom or transom structure 604 disposed above the door 610. Shown on the transom structure 604 is a plurality of screened inside air intake elements 606. The elements 606 compare to the inside grill housing 416 and the grill 418 of the door 392.

Within the transom structure 604 are the elements disposed within the top rail 406 of for the embodiment of the door 392 of FIG. 8A, These include the fan housing 432 and the fans 462 and 464, with their air deflectors 457 and 459, respectively, and associated elements. Also the filter housing 460, the bottom screen 462, the pre-filter 464 and the primary filter 466, the crossover 492 and the electronic control elements 542, such as circuit boards, etc., are also included in the transom structure 604 In other words, the structural elements except for the manifold conduits and the damper assembly is located in the transom structure 604. The manifold conduits thus extend from the top of the door 610 to the bottom rail. The damper assembly for the door 610 will be disposed in the bottom rail as shown in FIG. 8B for the door 392.

Between the transom structure 604 and the top of the door 610 is a sealing element 608. The sealing element 608 connects or seals a manifold crossover located in the transom 604 to manifold conduits located in the door 610.

At the lower portion of the door 610 is a fresh air register 630 through which fresh outside air is blown into the structure to which the door 610 is secured. The fresh air is delivered from an outside manifold conduit such as illustrated in FIGS. 8A and 8B and as discussed above in conjunction therewith.

The advantage of having a transom is that the elements disposed in the transom may be larger and more efficient than elements disposed within the door. Moreover, the elements may be installed during construction of the structure. The door 610 may then be less expensive and the overall cost of the energy recovery ventilator door assembly 600 may be less and more efficient. Finally, there will be increased energy recovery because the manifold will have increased length for greater heat energy recovery and transfer.

While the principles of the invention have been made clear in illustrative embodiments, there will be immediately obvious to those skilled in the art many modifications of structure, arrangements, proportions, the elements, materials, and components, and methods use din the practice of the invention, and otherwise, which are adapted to specific environments and operative requirements, without departing from those principles. For example, many different heat transfer materials or designs of manifold conduits and crossovers may be utilized as obvious alternatives to the designs shown. The appended claims are intended to cover and embrace any and all such modifications, within the limits only of the true spirit and scope of the invention.

What I claim is:

1. A ventilator door assembly for recovering heat energy secured to a structure comprising in combination:
    a door having a pair of spaced apart stiles and a top rail and a bottom rail appropriately secured together to define a frame;
    an inside panel secured to the frame and an outside panel secured to the frame;
    a manifold section disposed between the inside and outside panels having an inside manifold conduit through which an inside flow of air flows to an outside of the door through an opening in the outside panel and an outside manifold conduit through which an outside flow of air flows to an inside of the door through an opening in the inside panel;
    at least a single fan for providing flows of air for the inside and outside manifold conduits;
    a heat transfer element disposed between the inside manifold conduit and the outside manifold conduit for transferring the recovering heat energy from a first flow of air from one of the inside or outside manifold conduits and transferring the recovered heat energy to a second flow of air in the other of the inside or outside manifold conduits; and
    both the first air flow and the second air flow are modified by the recovered heat energy.

2. The ventilator door assembly of claim 1 in which the heat transfer element comprises a heat sink connecting the inside manifold conduit to the outside manifold conduit.

3. The ventilator door assembly of claim 1 in which the heat transfer element comprises a common wall between the inside manifold conduit and the outside manifold conduit.

4. The ventilator door assembly of claim 1 in which the manifold section is disposed between the top rail and the bottom rail.

5. The ventilator door assembly of claim 4 which includes insulation disposed between the inside manifold conduit and the outside panel.

6. The ventilator door assembly of claim 1 in which the at least a single fan includes an inside fan for providing the inside flow of air for the inside manifold conduit and an outside fan for providing the outside flow of air for the outside manifold conduit.

7. The ventilator door assembly of claim 6 in which the inside and outside fans are removable for maintenance and replacement.

8. The ventilator door assembly of claim 1 in which the manifold section includes a crossover for directing the inside flow of air to the inside manifold conduit and for directing the outside flow of air to the outside manifold conduit.

9. The ventilator door assembly of claim 8 in which the crossover is disposed in the upper rail.

10. The ventilator door assembly of claim 1 in which the inside manifold conduit terminates at the outside panel and the outside manifold terminates at the inside panel.

11. The ventilator door assembly of claim 10 in which the inside panel includes the opening through which the outside flow of air from the outside manifold conduit flows into the structure, and in which the outside panel includes the opening through which the inside flow of air from the inside manifold conduit flows out of the structure.

12. The ventilator door assembly of claim 11 which includes a damper assembly for controlling the flows of ai through the inside and outside manifold conduits to the respective openings in the outside and inside panels.

13. The ventilator assembly of claim 12 in which the damper assembly includes a movable outside damper panel for controlling the outside flow of air from the outside manifold conduit through the opening in the inside panel, and a movable inside damper panel for controlling the inside flow of air from the inside manifold conduit through the opening in the outside panel.

14. The ventilator door assembly of claim 13 in which the damper assembly includes a damper actuator for controlling the movable damper panels by moving the movable damper panels to control the flows of air through the respective inside and outside manifolds' conduits.

15. The ventilator door assembly of claim 14 in which the damper assembly is disposed in the bottom rail.

16. The ventilator door assembly of claim 1 which includes a primary filter for filtering the outside flow of air to the outside manifold.

17. The ventilator door assembly of claim 16 which includes a pre-filter for filtering the outside flow of air to the primary filter.

18. The ventilator door assembly of claim 1 which includes a transom disposed above the door and the at least a single fan is disposed in the transom.

19. The ventilator door assembly of claim 18 in which the at least a single fan comprises an inside fan for providing the inside flow of air to the inside manifold conduit and an outside fan for providing the outside flow of air to the outside manifold conduit and the inside fan and the outside fan are disposed in the transom.

20. The ventilator door assembly of claim 19 which includes a crossover for directing the outside flow of air to the outside manifold conduit and for directing the inside flow of air to the inside manifold conduit, and the crossover is disposed in the transom.

\* \* \* \* \*